UNITED STATES PATENT OFFICE.

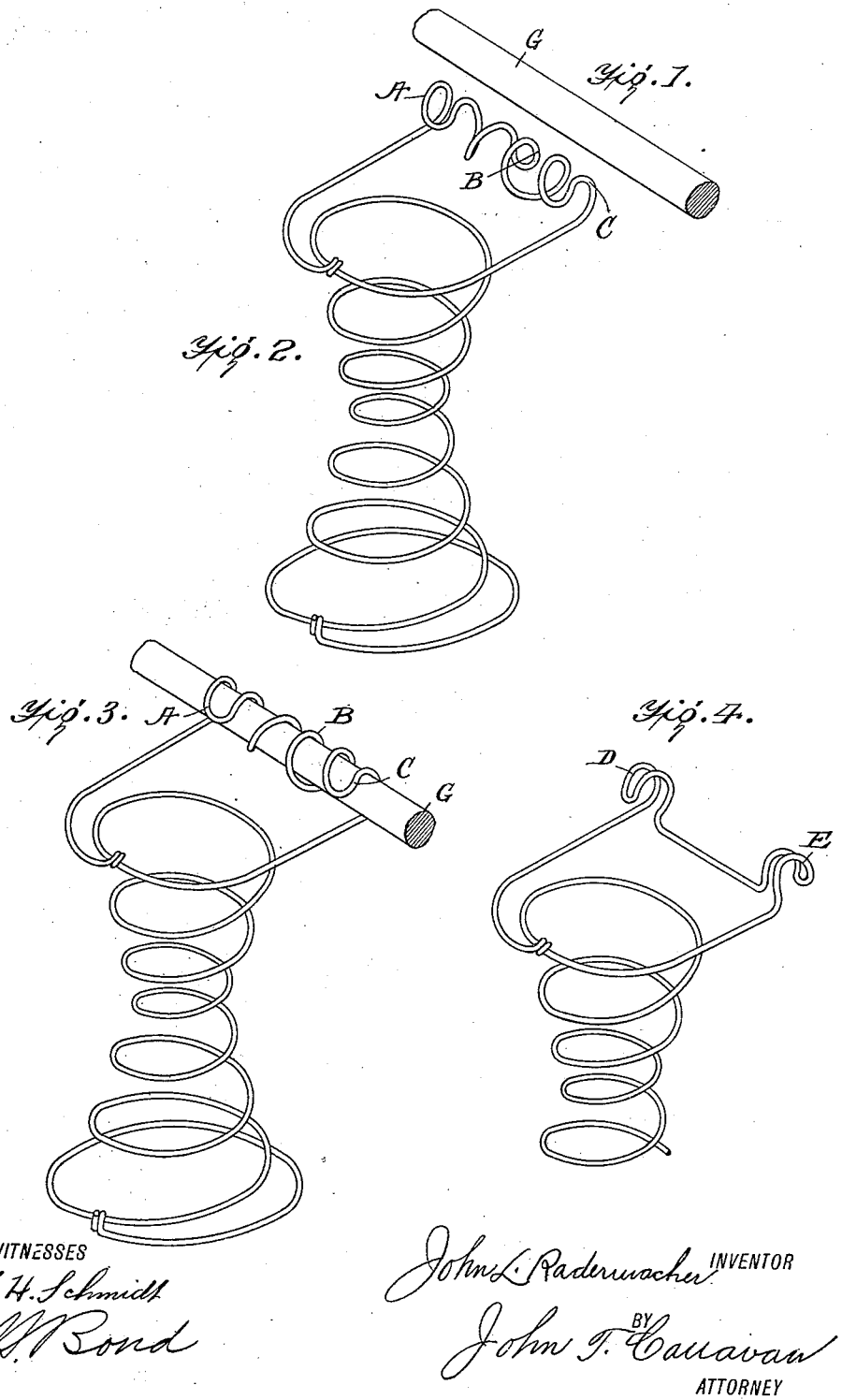

JOHN L. RADERMACHER, OF NEW YORK, N. Y.

SPRING FOR FURNITURE.

No. 917,793.  Specification of Letters Patent.  Patented April 13, 1909.

Application filed November 16, 1908. Serial No. 462,853.

*To all whom it may concern:*

Be it known that I, JOHN L. RADERMACHER, of the city, county, and State of New York, have invented a new and Improved Spring for Furniture; and I do hereby declare that the following is a full, clear, and exact description thereof, which will enable others skilled in the art to make and use the same, reference being had to the accompanying drawings, forming part of this specification.

The invention consists of a spring having the upper convolution twisted into loops extending in opposite directions at one or more points upon one side of the upper convolution, such loops forming hooks to receive the edging by the lateral insertion of the same, and such hooks holding the edging after insertion frictionally.

In the accompanying drawings, Figure 1 represents a perspective view of the edging generally used in the manufacture of spring beds and furniture, and consisting of ratan or other material. Fig. 2 is a perspective view of the spring. Fig. 3 is a perspective view showing the spring applied to the edging. Fig. 4 is a perspective view of a spring having the portions of the spring forming the sides of the loops on the upper convolution disposed close to each other.

Like letters of reference indicate like parts throughout the several views.

The loops are not complete turns or bights in the wire, but return upon themselves after circumscribing a part of the circle only, and thus the loops form vertically disposed hooks. The portions of the spring forming the sides of the loop may be separated from each other to a medium degree as shown in loops A, B and C in Figs. 2 and 3, respectively, or may be closed together as shown in loops D and E in Fig. 4.

I am aware that in the art at present a United States patent was duly issued to me on November 3rd, 1908, being No. 902,604, for a spring for beds and furniture having at one end a plurality of separated loops disposed vertically and forming extended bearings to receive an edging and an intermediate portion in the form of a hook to engage over the edging; but such patent shows loops consisting of a full turn at the end of the laterally extended part of the upper convolute. Such a loop requires the endwise insertion of the edging, and an edging cannot be inserted sidewise into the loops. In the present application, I seek to patent a spring differing structurally in that it is not formed into full round loops, but only into partial or returning loops as above stated, and differing functionally in that the edging may be inserted sidewise into all the loops, thus permitting greater facility in manufacturing.

The spring is in the usual form in use in the art except as hereinafter specified. As seen in Fig. 2, the upper convolute thereof is extended to form a lateral bearing portion having loops A, B, and C formed by twisting the wire at one side of the uppermost convolute. These loops are of convenient size to receive and hold firmly the edging G, by snapping upon it when it is inserted laterally as seen in Fig. 3, the loops being in the form of hooks and the central loop forming a bearing between the loops A and C, as will be clearly understood from Fig. 3.

In Fig. 4, I have shown the spring as provided with two loops or turns, D and E, one at each end of the upper lateral portion above the upper convolute, the portions of the spring forming the sides of the loops being closely pressed together.

What I claim as new is:—

A spring for beds and furniture formed at one end beyond and integral with the end convolute with a laterally extended portion with one end secured to the end convolute and having its cross portion connecting the parallel sides of said extension formed with partial or returning loops forming bearings near each end and intermediate the ends of said cross portion to receive by edgewise movement and embrace an edging, the said loops being permanently formed and oppositely disposed.

In testimony whereof, I have signed my name to this specification in the presence of two subscribing witnesses.

JOHN L. RADERMACHER.

Witnesses:
FRANCIS J. ARCHER,
WILLIAM GRENZER.